United States Patent
Graziani et al.

(10) Patent No.: US 7,928,980 B2
(45) Date of Patent: Apr. 19, 2011

(54) METHOD FOR VISUALIZING DATA CLOUDS USING COLOR AND OPACITY BLENDING

(75) Inventors: Paul Leonard Graziani, Wayne, PA (US); Edward Leland Mackey, Malvern, PA (US); David Jon Massa, Chester Springs, PA (US)

(73) Assignee: Analytical Graphics Inc., Exton, PA (US)

( * ) Notice: Subject to any disclaimer, the term of this patent is extended or adjusted under 35 U.S.C. 154(b) by 942 days.

(21) Appl. No.: 11/780,285

(22) Filed: Jul. 19, 2007

(65) Prior Publication Data

US 2009/0021516 A1    Jan. 22, 2009

(51) Int. Cl.
*G06T 15/50* (2006.01)
*G09G 5/00* (2006.01)
(52) U.S. Cl. .......................... 345/426; 345/629
(58) Field of Classification Search .................. None
See application file for complete search history.

(56) References Cited

U.S. PATENT DOCUMENTS

| | | | | |
|---|---|---|---|---|
| 5,339,386 | A * | 8/1994 | Sodenberg et al. | 345/422 |
| 7,046,253 | B2 * | 5/2006 | Long et al. | 345/591 |
| 7,154,496 | B1 * | 12/2006 | Engel et al. | 345/419 |
| 2006/0176303 | A1 * | 8/2006 | Fairclough | 345/426 |

OTHER PUBLICATIONS

Valsecchi G.B., Farinella, P., Rossi, A.: Collision risk: a new method for assessing and visualizing it. Acta Astron. 53, 203-217 (2003).*

* cited by examiner

*Primary Examiner* — Daniel F Hajnik
(74) *Attorney, Agent, or Firm* — The Marbury Law Group PLLC

(57) ABSTRACT

In order to address the challenge associated with the analysis and visualization of large datasets, a method and apparatus provides for visualizing data clouds using color and opacity blending. The information stored within the data cloud is represented using a data container object. The colors and opacities associated with the container object's data point or points is blended to develop two-dimensional computer generated imagery that is unique to the virtual reference point chosen, typically within an OpenGL environment. The result is the ability to understand the sample density of large interactively rendered datasets from different reference points and as the datasets change over time.

20 Claims, 5 Drawing Sheets

VIRTUAL
CAMERA VIEW

VIRTUAL
CAMERA
ORIENTATION

VIRTUAL
CAMERA VIEW

VIRTUAL
CAMERA
ORIENTATION

US 7,928,980 B2

METHOD FOR VISUALIZING DATA CLOUDS USING COLOR AND OPACITY BLENDING

FIELD OF THE INVENTION

Embodiments herein relate to the creation of computer generated imagery for computer-generated visualization of large data clouds, such as found in numerical particle simulations or astronomical observations, using a novel color and opacity blending approach.

BACKGROUND

For many scientists, the study of large datasets is an ongoing challenge. Numerical analyses are used to study a wide range of disciplines from computational physics and astronomical calculations to human economic systems. As part of their study, scientists often desire to visually represent their data cloud using computer generated imagery (CGI).

The visualization of this data using CGI is important because it allows scientists to rapidly draw conclusions from the data and to enhance their general cognition. Because of the potential benefits, a variety of visualization systems have been developed to convert three-dimensional (3D) datasets into two-dimensional (2D) CGI that is displayed on standard computer monitors.

One data cloud visualization method is disclosed in U.S. Pat. No. 6,278,459. This technique, like many others, uses a volume-rendering technique that first parcels the 3D space into smaller volumes referred to as voxels. These voxels are mathematical entities that are assigned attributes for color and opacity based on a user defined criteria. When converted into 2D CGI for display, the voxel properties are used to create pixels that define the appearance. While this process provides a great deal of flexibility in how static datasets are displayed, it produces significant processing overhead.

Another prior art data visualization method is disclosed in U.S. Pat. No. 5,339,386. This visualization technique also takes a volumetric approach towards the rendering of data. While the Open Graphics Language (Open GL) volumetric method of the '386 patent is an effective technique for creating distance specific effects for smoke, fog, and other volumetric calculations that need to change as the viewpoint moves through the effected volume, it introduces processes not needed for scientific visualizations where visualizing the entire dataset simultaneously is required. Additionally, the technique disclosed in the patent is limited in the range of color and opacity available due to the opacity blending approach that is used.

To address the many challenges associated with traditional data cloud visualization techniques, a method is needed to interactively render large datasets that change over time with blended color and opacity using both polygons and 2D image maps in an Open GL environment.

SUMMARY

An embodiment provides a method for visualizing 3D data clouds using a color and opacity blending technique with lower processor demands.

A further embodiment provides a method for visualizing 3D data clouds using color and opacity blending of a container object for the information contained within the data cloud.

An embodiment provides a method for visualizing 3D data clouds using color and opacity blending of a visual representation of a container object for the information contained within the data cloud.

Another embodiment provides a method for visualizing 3D data clouds using color and opacity blending from a process of assigning color C and opacity α for each data point.

Yet another embodiment provides a method for visualizing 3D data clouds using color and opacity blending from a virtual reference point with definable distance, orientation, and field of view.

Another embodiment provides a method for visualizing 3D data clouds using color and opacity blending from a process of combining the color and opacity of objects within a pixel pipeline.

A further embodiment provides a method for visualizing 3D data clouds using color and opacity blending to determine the density of data points using a range of values.

Yet another embodiment provides a method for visualizing 3D data clouds using color and opacity blending to develop 2D CGI from the plurality of pixels.

These and other embodiments will be apparent to those of ordinary skill in the art upon review of the claims drawn to the invention, the drawings, and the specification describing the invention.

DETAILED DESCRIPTION

As used herein, the following terms have the following meanings. The term data point refers to a single instance of measurement information that can be drawn inside a display environment. The term data set refers to a collection of related data points that represent information for one element of a larger study. The term data cloud refers to a large number of processed data points that can be instantiated within a display environment. The term container object refers to a software entity that stores the attributes and behaviors for the displayed data points. The term individual object refers to a single data point that has been processed such that it can be instantiated within a display environment. The term multi-track object refers to a container object that contains multiple data tracks. The term data track refers to data points with time-varying attributes. The term instantiation refers to the process of creating a specific instance of an object within software.

An embodiment of the present invention creates 2D CGI from 3D data points that change over time. An embodiment of the present invention also provides a method for rendering the data points in an OpenGL based system that extends the range of color and opacity available to layered data points using blended shading with either textures or polygon models. A typical graphics pipeline includes steps such as modeling transformation, viewing transformation, projection transformation, and clipping for defining the distance, orientation, and field of view from a viewing reference point. Within the graphics pipeline, a step of scan conversion or rasterization produces the ultimate rendering information for a display. The disclosed color and opacity blending will typically be part of the rasterization step used to render the pixels for the 2D CGI.

Figure 1:
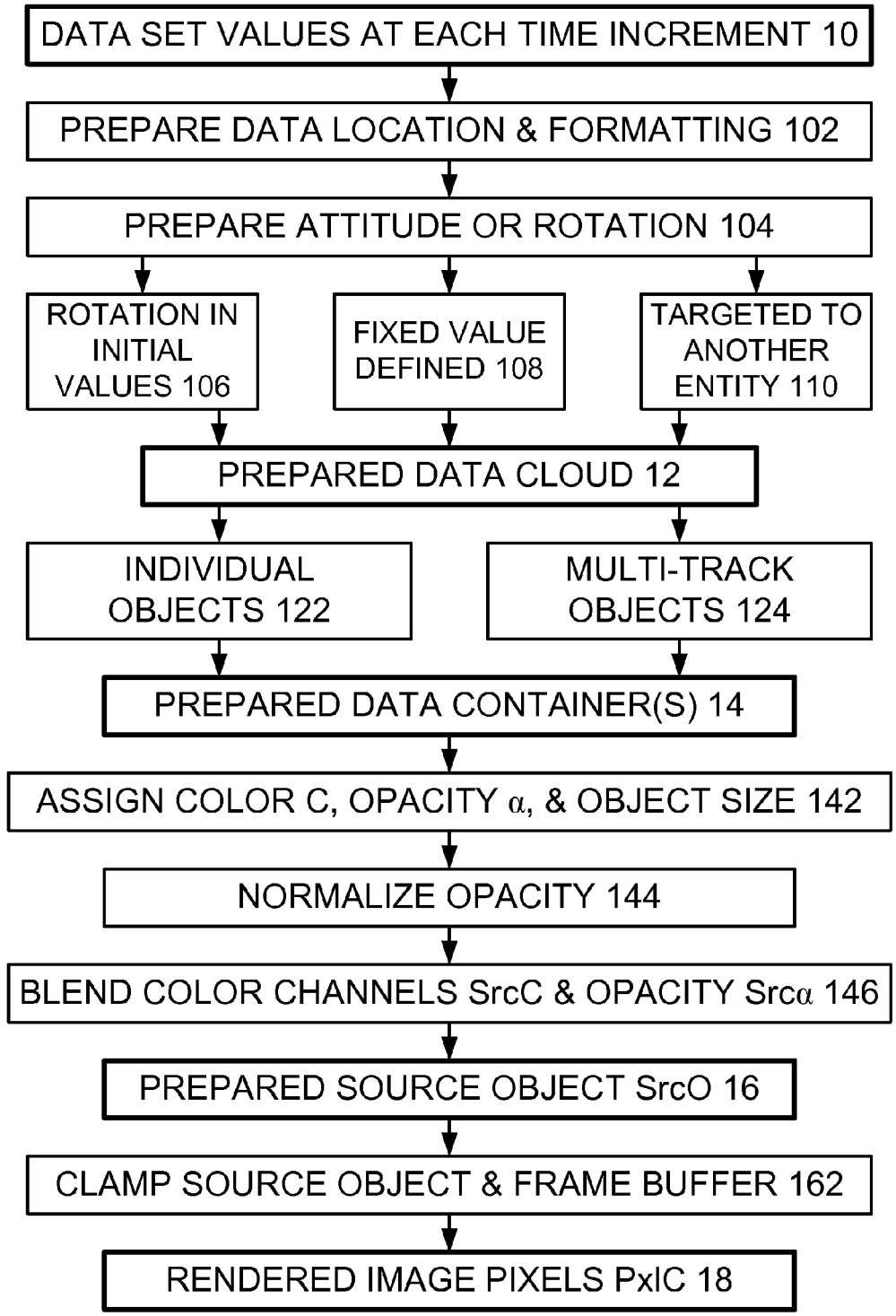
FIG. 1 illustrates a flowchart of a rendering pipeline in accordance with an embodiment that generates 2D CGI with blended color and opacity.

Referring to FIG. 1, the rendering pipeline for an embodiment is illustrated. The pipeline begins with a data set 10 at a given time designation. The data is first processed at 102 such that each unique entry or data point within the data set has a location in 3D space and, if necessary, is formatted. The attitude or rotation for each data point is prepared at 104. Once each individual data point has a unique position defined, a container and a representation for the data point is used.

The container 14 for the data point can be a unique or individual object 122 for a single time increment or the entire time interval. Alternately, the container object within the software application can be a grouping of all of the data points into a single object for each time increment or the entire time interval as a multi-track object 124. Visually, the point can be represented with either a polygon or 2D image marker. If attitude information is not supplied in the initial values 106 for the data point, then the rendering system must determine how the container object will rotate with respect to a viewing reference point (or virtual camera). The attitude of the container object(s) can be provided from the original information in the data set as initial values 106, have a fixed value defined 108 in 3D space, or targeted to another entity 110.

For example, on Jan. 11, 2007, an aging weather satellite was destroyed by a Chinese rocket launch that resulted in hundreds of pieces of tracked debris. Each piece of tracked debris could be processed such that it has time-based longitude, latitude, and altitude relative to the Earth. In this instance, the orientation of attitude of the debris pieces is unknown. For each tracked piece of debris (data point), the method represents the data point with something that can be visualized. Given the vast volume of space, each small 4 cm piece of debris can be visualized by a large object (i.e., a polygon that is 10 km square). If the square polygon is defined with a fixed attitude (i.e., perpendicular to the Earth), the polygon will be completely visible when the debris orbiting the Earth is perpendicular to the viewing reference point (or virtual camera). As the debris piece continues to orbit the Earth, the attitude will continue to rotate until only the edge of the polygon is visible (making the data point nearly invisible). In the case where the square polygon described above is defined with a targeted attitude (i.e. perpendicular to the viewing reference point or virtual camera), the polygon will always be visible. As the debris orbits the Earth, the attitude (or orientation) of the polygon representing the debris will constantly turn to face perpendicular to the reference point or virtual camera.

In the cases where the data set provides attitude data or uses fixed attitude data, embodiments of the visualization system do not require additional processing for representing the rotational attributes of the objects(s). If, however, the object(s) representing the data points target another entity, then the visualization embodiment needs to update the orientation of the container object(s) as the target object rotates.

Figure 2:
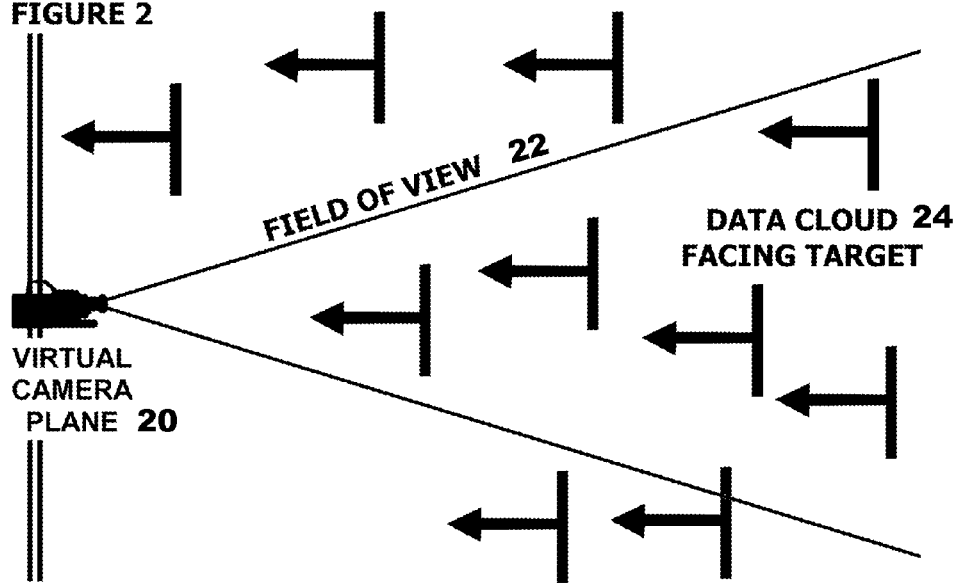
FIG. 2 illustrates the position of the viewing reference point relative to the data cloud using a targeting method for the objects in the cloud in accordance with an embodiment of the invention.
Figure 3:
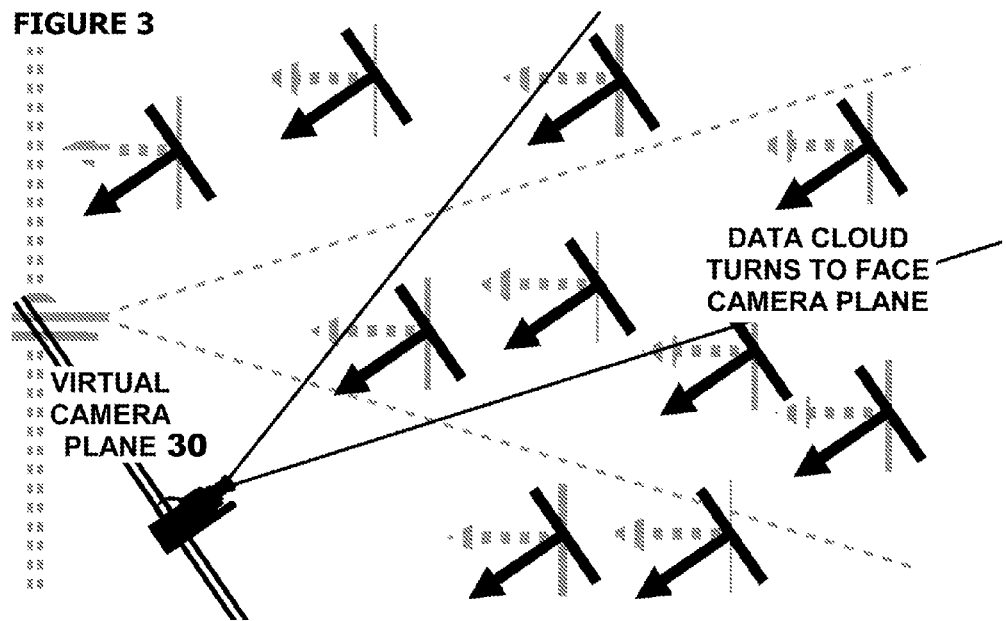
FIG. 3 illustrates the effect of changing the position of the viewing reference point relative to the data cloud using a targeting method for the objects in the cloud in accordance with an embodiment of the invention.

Referring to FIG. 2 and FIG. 3, a common entity for the container object(s) to target is the virtual camera plane 20 having an initial field of view 22. As the virtual camera plane 20, 30 changes position relative to the data cloud 24, the polygon or 2D image map used to represent that data point is rotated to continually face the virtual camera plane 30.

Figure 4A:
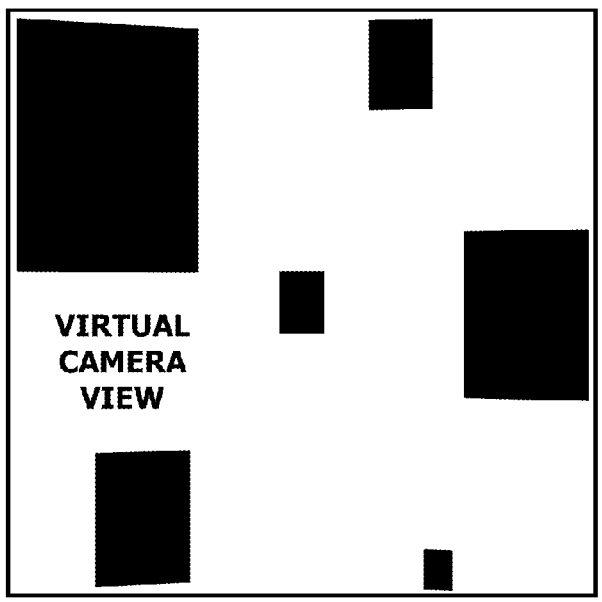
FIGS. 4A-4B illustrate how fixing the size of the container object can result in sizing differences in the rendered 2D CGI due to distance.
Figure 4B:
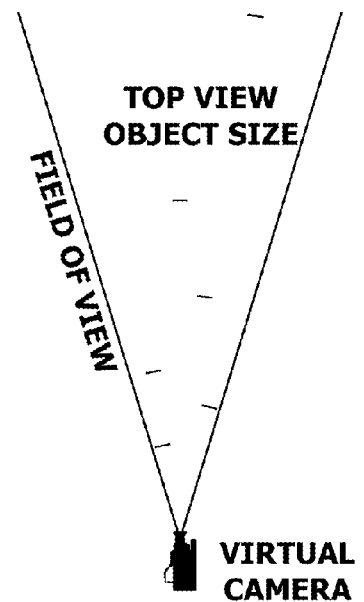
Figure 5A:
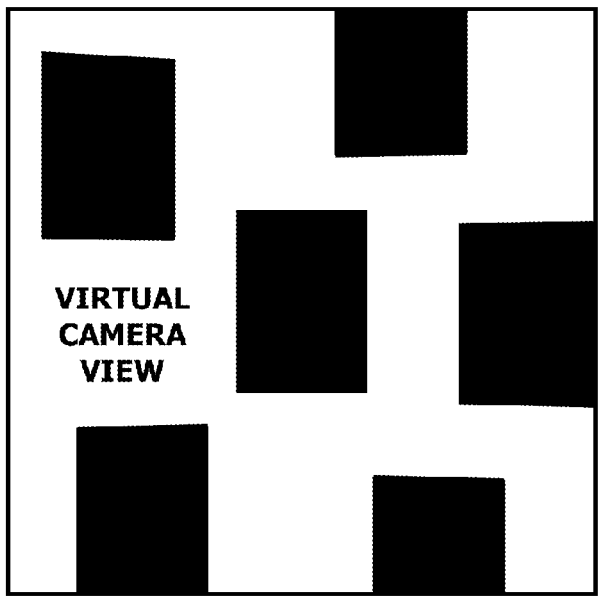
FIGS. 5A-5B illustrate how resizing the individual components of a container objects can result maintaining object size in the rendered 2D CGI regardless of distance.
Figure 5B:
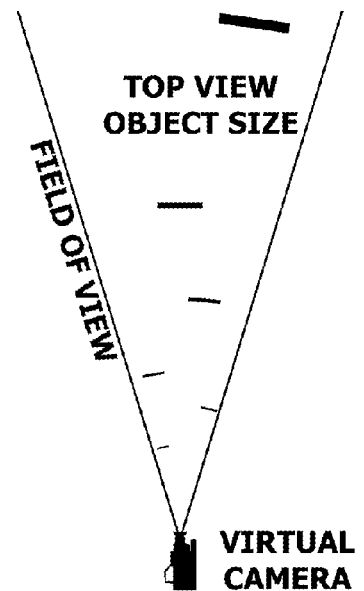

In addition to the location and attitude, the relative size of the container object(s) can scale to maintain the same size within the virtual camera's available field of view or can stay fixed making the container object(s) appear larger or smaller depending on the distance to the virtual camera. Referring to FIGS. 4A-4B and FIGS. 5A-5B, two examples are illustrated that demonstrate how changing the sizing function of the container object affects the resulting 2D CGI. In FIGS. 4A-4B, the container object(s) remain as a fixed size resulting in sizing differences in the rendered 2D CGI of FIG. 4A due to distance differences in the field of view as shown in FIG. 4B. In FIGS. 5A-5B, the polygons or 2D image markers resize in the field of view in FIG. 5B such that they appear to be the same size in the rendered 2D display of FIG. 5A.

For both polygons and 2D image map representations, the data point has a defined color C and opacity level $\alpha$. The color is designated with either 8 or 24 bits of color and every 8 bits contain 256 divisions. As such, if an 8-bit color is used, then the resulting rendering is designated as a color from 0 to 255 at whole number intervals. If 24-bit color is used, then the color is split into red, green, and blue channels ($C_R$, $C_G$, $C_B$) each with a range of 0 to 255. Therefore, with each channel having a 256 unit range, the resulting color has a range of 16,777,216 different combinations (256 red×256 green×256 blue).

The opacity (also referred to as "alpha" or "$\alpha$") of either the polygon or the image is designated with 8 bits of data. As such, the range of representation from opaque to completely transparent has 256 divisions in whole number intervals from 0 to 255.

With the location, color and opacity defined for each data point, the Open GL rendering system can create a 2D CGI for display. In order to create this display using a process referred to as rendering, the system must generate pixels for the computer display. The color of each pixel is dependant upon the characteristics of the virtual camera, the data set representation, and other entities present in the 3D environment.

The virtual camera is the tool used by the visualization application to determine what in the 3D environment should be displayed. Depending on the distance, orientation, and field of view of the virtual camera relative to the data set, different data points will be in view.

Figure 6A:
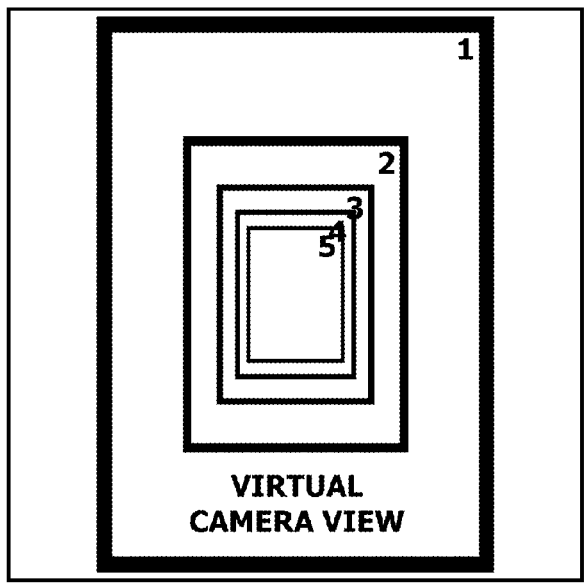
FIGS. 6A-6B illustrate how the position and orientation of the viewing reference point can result in all of the data points being stacked within the field of view.
Figure 6B:
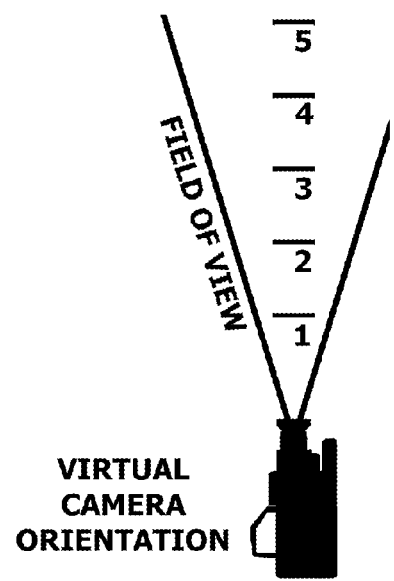
Figure 7A:
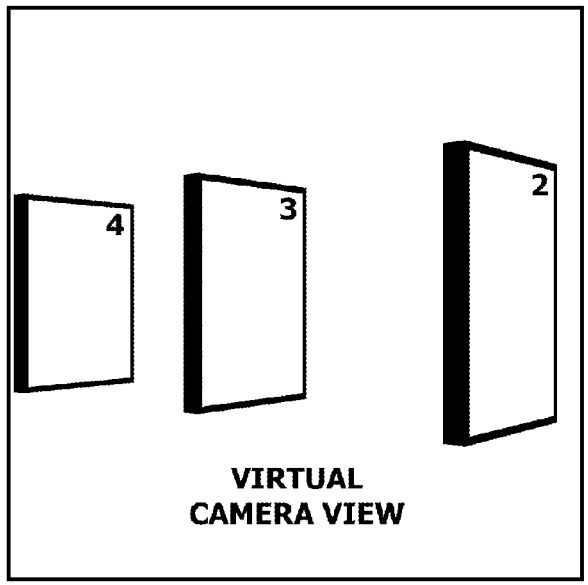
FIGS. 7A-7B illustrate how the position and orientation of the viewing reference point can result in none of the data points being stacked and portions of the data being out of the field of view.
Figure 7B:
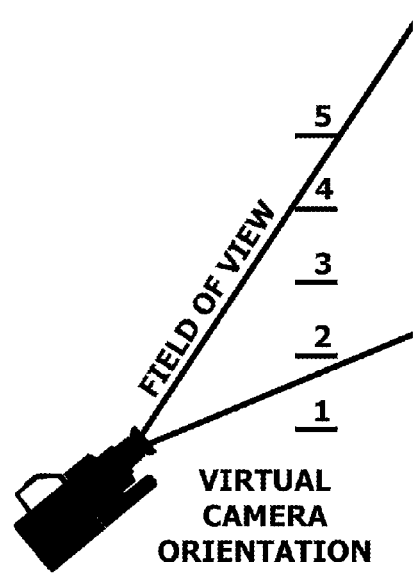

Referring to FIGS. 6A-6B and FIGS. 7A-7B, two examples are illustrated that demonstrate how changing the position and orientation of the virtual camera changes the visibility of the same data set. In FIG. 6B, the entire dataset is in the field of view of the camera and each data point in the cloud is stacked in front of one another in the virtual camera view of FIG. 6A. In FIG. 7B, the position of the virtual camera eliminates some of the data points from the field of view and none of the points in the data cloud are stacked in front of one another, as illustrated in FIG. 7A.

Once the virtual camera's characteristics are defined, the rendering system determines how each pixel within the virtual camera's field of view should be represented by evaluating the color and opacity of the objects residing in this pixel's space. A phrase to describe this process is the pixel pipeline, which is part of a typical rasterization step.

The first step in determining the color of a pixel PxlC within the pixel pipeline is to start with a background color ($C_R$, $C_G$, $C_B$) and store this color in the frame buffer, where the stored value is FrmC. With an established FrmC, the next source object (SrcO) in the pixel pipeline is examined for C and $\alpha$.

Figure 8:
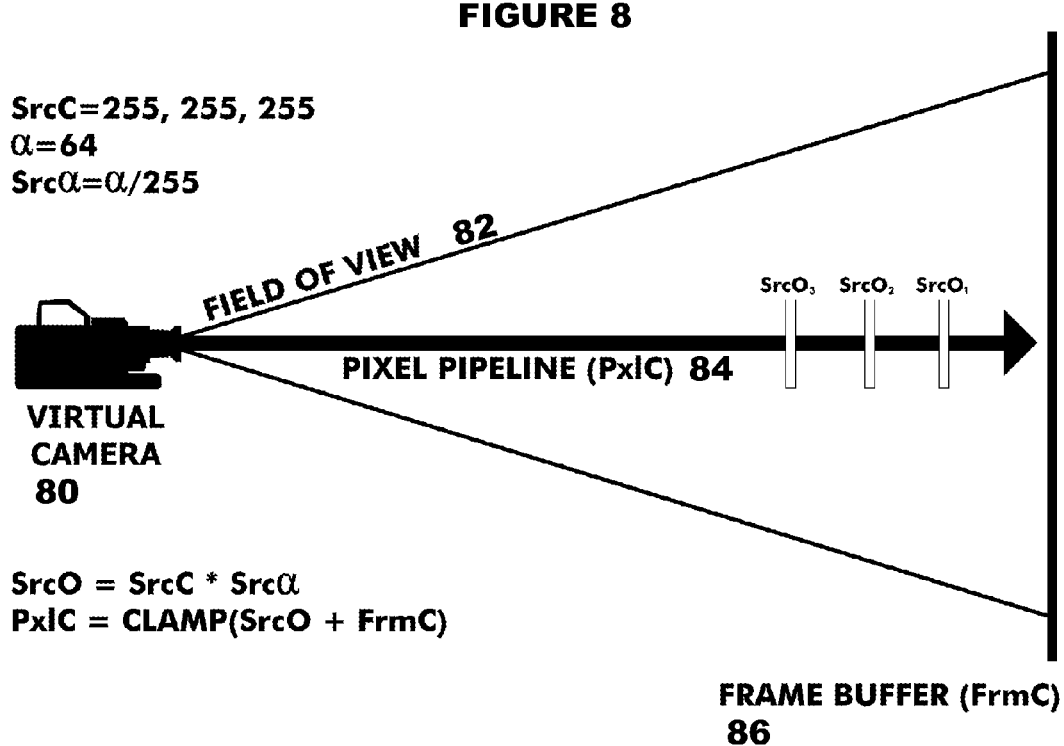
FIG. 8 illustrates how semi-transparent objects with the same color determine the characteristics of the pixel in the final composite.

Referring to FIG. 8, the ray directed towards the virtual camera 80 represents a specific path through the objects within the pixel pipeline 84 that the rendering system needs to represent for field of view 82 with a background color value FrmC stored in the frame buffer 86. In this example, the color of all of the objects are pure white (255, 255, 255 in the $C_R$, $C_G$, $C_B$), but the objects are partially transparent (64 out of 256 available levels of alpha).

To determine the effect of the alpha channel on the color channels (SrcC), the alpha channel integer range of 0 to 255 is normalized to a decimal range between 0 and 1 (Src$\alpha$). This resulting Src$\alpha$ value is multiplied to the SrcC to determine the SrcO values. The source object equations are:

$$SrcO = SrcC * Src\alpha \quad [1]$$

With the characteristics of a SrcO established, the resulting PxlC can be determined by clamping the sum of the FrmC with the SrcO. This embodiment clamps the resulting value to ensure that the 24-bit color does not exceed 255 in either $C_R$, $C_G$, $C_B$. As such, the "Clamp" term specified in the equation below limits the result to 255, 255, 255 in $C_R$, $C_G$, $C_B$:

$$PxlC = Clamp(SrcO + FrmC) \quad [2]$$

This blending technique is novel in comparison to the prior art. Typically, the stored value FrmC is adjusted by the Src$\alpha$ to prevent the need of clamping the summation of the SrcO with the FrmC. An equation to represent such prior art techniques is:

$$PxlC = SrcO + FrmC*(1.0 - Src\alpha) \quad [3](Prior Art)$$

An advantage of the presently disclosed method is the extension of the range of the displayed representation for stacked data points. The technique employed by prior art for identically colored data points limits a PxlC to ranges from transparent to opaque on a point to point gradient between colors. The technique in the disclosed embodiment extends the range between colors to continually change (increase in $C_R$, $C_G$, $C_B$) until pure white is established.

Figure 9A:
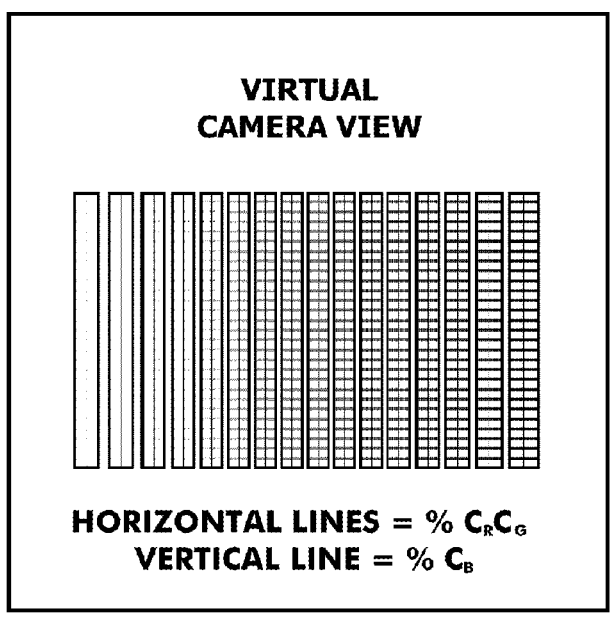
FIGS. 9A-9B illustrate how multiple pixel pipeline rays pass through different quantities of objects to produce the range of resulting pixel colors.
Figure 9B:
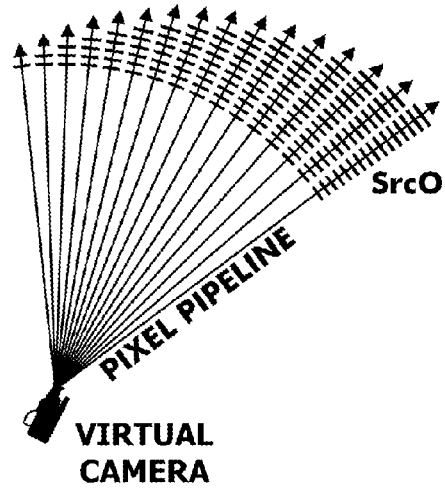

Referring to FIGS. 9A-9B, multiple pixel pipeline rays pass through objects that are blue (64, 64, 255 in the $C_R$, $C_G$, $C_B$) and partially transparent (64 out of 256 available levels of alpha). As different quantities of objects intersect the pixel pipeline, the color of PxlC changes, resulting in 2D CGI that transitions from transparent to opaque blue and then to opaque white.

As a result, the disclosed embodiments create 2D CGI with representative data "density" from a given viewing reference point of 3D data clouds.

An example of an implementation of this technology is available in an analysis and visualization software program called Satellite Tool Kit® 8 or STK® 8, introduced by Analytical Graphics, Inc. in November 2006. Typical hardware for implementing the process via software instructions is a desktop or laptop computer or desktop workstation having a 32 or 64 bit Intel or AMD processor running at 1 GHz or higher with Microsoft Windows® 2000/XP/XP Professional x64 operating system software, 512 MB or more of RAM, OpenGL Library Version 1.2 or higher, and an OpenGL-compatible 3-D video card such as an NVIDIA GeForce to display the output on a video display capable of displaying millions of colors (24-bit color depth), such as a CRT or LCD computer monitor.

A system and method for providing computer-generated visualization of large data clouds using color and opacity blending have been described. It will be understood by those skilled in the art that the present invention may be embodied in other specific forms without departing from the scope of the disclosed embodiments and that the examples and embodiments described herein are in all respects illustrative and not restrictive. Those skilled in the art of the present invention will recognize that other embodiments using the concepts described herein are also possible. Further, any reference to claim elements in the singular, for example, using the articles "a," "an," or "the" is not to be construed as limiting the element to the singular.

What is claimed is:

1. A method for visualizing data clouds using color and opacity blending comprising:
    inputting three-dimensional (3D) data points of a data set into a computer system as objects;
    creating one or more data containers for the objects;
    assigning color C, opacity $\alpha$, and object size for each object;
    defining the distance, orientation, and field of view from a viewing reference point for each object;
    representing the color and opacity of the objects that reside within a single pixel PxlC in a two dimensional (2D) view from the viewing reference point by blending the colors C and opacities $\alpha$ of stacked objects wherein:
        PxlC=Clamp(ScrO+FrmC) where
            Clamp limits results to 255, 255, 255 in $C_R$, $C_G$, $C_B$,
            FrmC is a stored value for background color,
            source object SrcO=SrcC*Src$\alpha$,
            SrcC is designated with either 8 or 24 bits of color, and opacity $\alpha$ is designated with 8 bits and Src$\alpha$=$\alpha$/255;
    representing the color and opacity of the objects by blending the colors C and opacities $\alpha$ of stacked objects for remaining pixels PxlC in a frame buffer to process a pixel pipeline; and
    rendering image pixels in the frame buffer on a display as a visual representation of information stored in the data cloud, wherein the blending results in an extension of the range between colors in the stacked objects and wherein the objects represent space debris, satellites, or other orbiting objects around the earth.

2. The method for visualizing data clouds using color and opacity blending of claim 1 wherein the data container comprises a set of individual objects for each data point within the data set that contains no time increments or a static time value.

3. The method for visualizing data clouds using color and opacity blending of claim 1 wherein the data container comprises a set of individual objects for each data point within the data set that varies over time.

4. The method for visualizing data clouds using color and opacity blending of claim 1 wherein the data container comprises an object with a plurality of data points that contains no time increments or a static time value.

5. The method for visualizing data clouds using color and opacity blending of claim 1 wherein the data container comprises an object with a plurality of data points that varies over time.

6. The method for visualizing data clouds using color and opacity blending of claim 1 wherein the data container further comprises at least one object with rotational or attitude information from the data set.

7. The method for visualizing data clouds using color and opacity blending of claim 1 wherein the data container further comprises at least one object with fixed rotational or attitude information that is not dependent upon the position of the viewing reference point.

8. The method for visualizing data clouds using color and opacity blending of claim 1 wherein the data container further comprises at least one object comprising attitude of the container object that is linked to the motion of another entity within the same 3D environment.

9. The method for visualizing data clouds using color and opacity blending of claim 1 wherein the data container further comprises at least one object with a fixed scale that is not dependent upon the relative position of the viewing reference point.

10. The method for visualizing data clouds using color and opacity blending of claim 1 wherein the data container further comprises at least one object with scaling to maintain an equal size representation for all data points within the viewing reference point's field of view.

11. The method for visualizing data clouds using color and opacity blending of claim 1 wherein the SrcC is designated with 8 bits.

12. The method for visualizing data clouds using color and opacity blending of claim 1 wherein SrcC is designated with 24-bit color $C_R$, $C_G$, $C_B$.

13. The method for visualizing data clouds using color and opacity blending of claim 1 wherein the visual representation of information stored in the data cloud further comprises a representation using a polygon model.

14. The method for visualizing data clouds using color and opacity blending of claim 1 wherein the visual representation of information stored in the data cloud further comprises a representation using a 2D image map.

15. The method for visualizing data clouds using color and opacity blending of claim 14, wherein the rendering is representative of a density of objects at a particular location within the data cloud.

16. The method for visualizing data clouds using color and opacity blending of claim 1 wherein representing the color and opacity of the objects that reside within PxlC further comprises the storing of background color $C_R$, $C_G$, $C_B$ into FrmC.

17. The method for visualizing data clouds using color and opacity blending of claim 1 wherein representing the color and opacity of the objects that reside within PxlC further comprises the storing of color $C_R$, $C_G$, $C_B$ and opacity $\alpha$ from other objects within the 3D environment into a frame buffer as a rasterization step.

18. A method for visualizing a data cloud over time, comprising:
   providing at least one data point location in each object within a data cloud and orientation information for the at least one data point or object;
   assigning color C, opacity $\alpha$, and object size for each object in the data cloud;
   normalizing opacity $\alpha$;
   blending color channels and the normalized opacity for stacked objects to prepare a source object SrcO;
   clamping the source object SrcO and frame buffer FrmC; and
   rendering image pixels PxlC, wherein:
   PxlC=Clamp(ScrO+FrmC) where
      Clamp limits results to 255, 255, 255 in $C_R$, $C_G$, $C_B$ color channels,
      FrmC is a stored value of a background color in a frame buffer,
      source object SrcO=SrcC*Srcα,
      SrcC is designated with 24 bits of color, and
      opacity $\alpha$ is designated with 8 bits and is normalized as Srcα=α/255, and
   wherein the blending results in an extension of the range between colors in the stacked objects and wherein the objects represent space debris, satellites, or other orbiting objects around the earth.

19. The method of visualizing a data cloud over time in accordance with claim 18, wherein each object is selected from the group consisting of an individual object for a data point at a single time increment, an individual object for a data point over an entire time interval, a multi-track object for a grouping of all of the data points at each time increment, and a multi-track object for a grouping of all of the data points over an entire time interval.

20. The method for visualizing a data cloud over time claim 18, wherein rendering the pixels Pxlc comprises rendering the pixels Pxlc to create a visual representation of information stored in the data cloud that is representative of a density of objects at a particular data point location within the data cloud at a point in time.

* * * * *